Patented Jan. 28, 1936

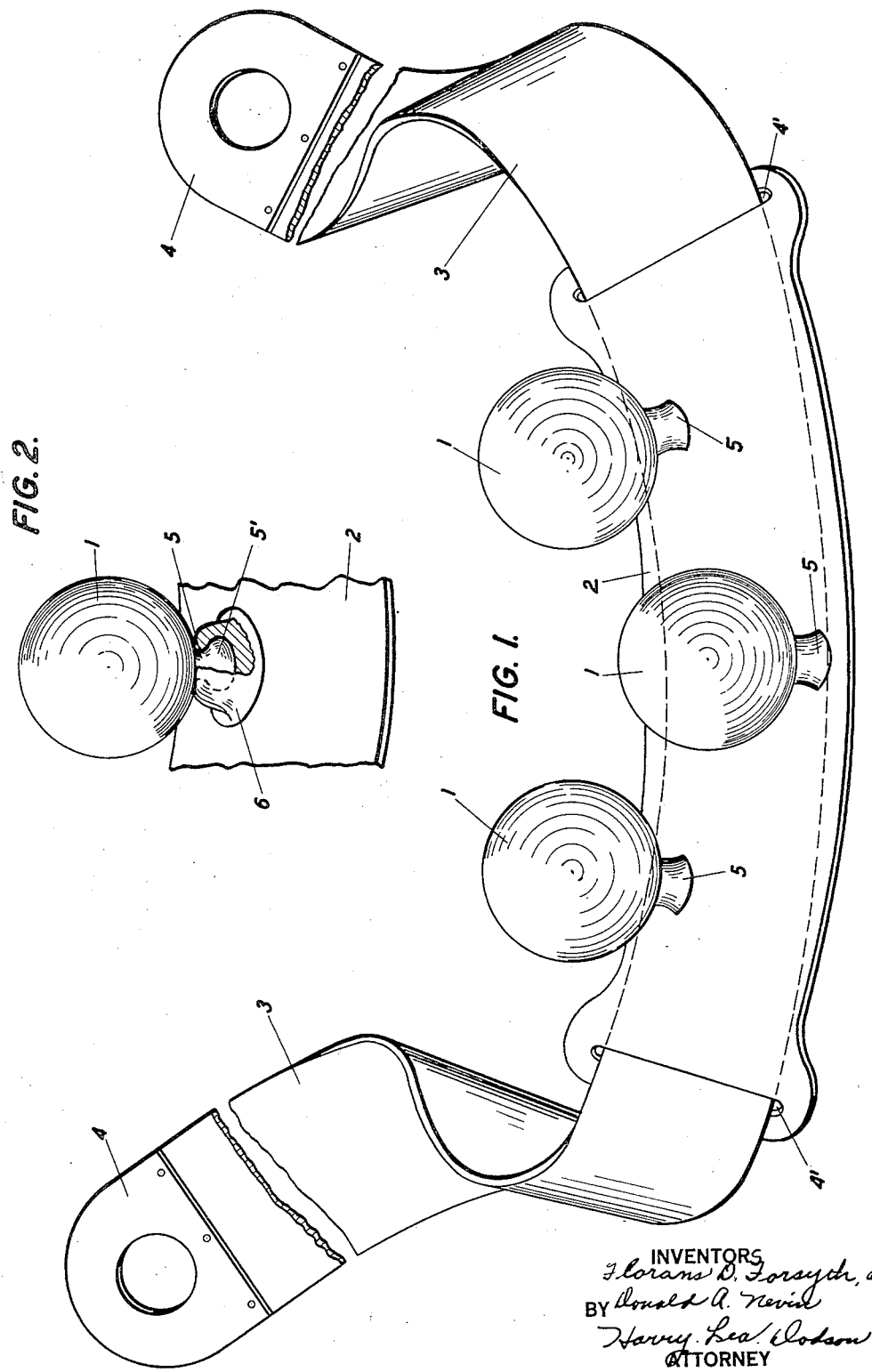

2,028,865

UNITED STATES PATENT OFFICE 2,028,865

MASSAGING DEVICE

Florans D. Forsyth, Athens, Ohio, and Donald A. Nevin, Waynesboro, Pa.

Application March 9, 1935, Serial No. 10,130

1 Claim. (Cl. 128—63)

Our invention relates to that class of devices which are designed to be used to massage the abdomen though practice has shown that our device is also useful for other parts of the body.

Our invention has for its principal object to provide a plurality of balls so mounted upon a plate or band as to provide a partial planetary and a partial axial movement of said balls.

A further object is to provide a construction which will permit the use of the device with any of the standard vibrating machines.

A further object is to provide a construction which will provide for a full planetary as well as a full rotary movement of the balls.

Our means of accomplishing the foregoing objects may be more readily understood by having reference to the accompanying drawing, which is hereunto annexed and is a part of this specification, in which—

Fig. 1 is a perspective view of our device secured to a belt to be operated by a vibrating machine.

Fig. 2 is a detail view showing a modified form.

Similar reference numerals refer to similar parts throughout the entire description.

As shown in the drawing, the massaging balls 1, which may be formed of any desired material such as hard rubber, vitrified paper, or a flexible material where a great degree of flexibility is desired.

The balls 1 may be made of either soft or hard rubber or both and can be mounted on the plate 2 in straight rows spaced from each other or in staggered relation as desired.

Eyelets 4, formed of metal, leather or other suitable material, are provided at each end of a flexible belt 3 which may be secured to a hook or hooks (not shown) in a wall or may be fastened to the spindles of a vibrating machine (not shown) such as commonly employed for massaging, reducing or exercising.

Slots 4' are punched or formed in each end of the plate 2 and provide a convenient way to mount the plate 2 on the flexible belt 3 which may be passed through the slots 4' and across the back of the plate as inked in dotted lines or it may be secured by sewing the end of the belt to the slots 4' when the belt 3 is not made in a continuous strip.

Each ball is preferably provided with a flexible stem 5 formed integral therewith, the end of which may be vulcanized to the plate 2 or secured in any suitable or desired manner. When so constructed the balls will have a partial axial as well as a partial planetary movement due to the flexibility of the stem which permits both movements to a degree.

Where a greater degree of movement is desired, it may be obtained by constructing the balls 1 as shown in Fig. 2. In this construction the stem 5 terminates in a ball 5' which is mounted in a socket 6. This socket 6 may be secured to the plate 2 in any suitable manner which will hold it securely. Obviously when this form of construction is employed both a full planetary, as well as an axial movement of the balls 1 will be obtainable.

It will be clear from the foregoing description that the plate 2, with the balls 1 mounted thereon, may be used by hand and without the flexible belt 3. When the latter is used it is usually passed around the body or limb bringing the balls 1 into position over the abdomen or such part thereof which is to be massaged.

Having described our invention what we regard as new and desire to secure by Letters Patent is:

In a massaging device, a belt formed of flexible material, a rectangular plate, there being a slot at each end of said plate which fits said belt whereby the plate may be detachably secured to the belt, said plate having a plurality of sockets formed thereon, there being a central opening in said socket, a plurality of rubber balls having relatively short flexible stems formed integral therewith, said stems terminating in a ball of larger diameter than the opening of said socket and adapted to be compressed to enter said socket whereby both a full planetary as well as axial movement of the ball will take place when in use.

FLORANS D. FORSYTH.
DONALD A. NEVIN.